United States Patent [19]

Grant

[11] 4,401,260
[45] Aug. 30, 1983

[54] SELF-OPERATED AIR REGISTER DAMPER

[76] Inventor: Willie T. Grant, 400 S. Simms St., Lakewood, Colo. 80228

[21] Appl. No.: 328,814

[22] Filed: Dec. 9, 1981

[51] Int. Cl.³ ............................................. F24D 5/02
[52] U.S. Cl. .................................... 236/9 A; 98/102; 49/334; 251/133; 251/294
[58] Field of Search ............ 236/9 A, 11, 74 R; 49/86, 334; 98/102, 106, 107; 251/133, 294; 165/25

[56] References Cited

U.S. PATENT DOCUMENTS

| | | | |
|---|---|---|---|
| 2,269,036 | 1/1942 | Nessell | 236/11 X |
| 2,271,487 | 1/1942 | Nessell | 236/9 A |
| 2,274,614 | 2/1942 | Nessell | 236/9 A X |
| 2,758,791 | 8/1956 | Jenkins | 236/9 A |
| 2,789,767 | 4/1957 | Martinson | 236/9 A |
| 3,154,247 | 10/1964 | Carlson | 236/9 A |
| 3,348,922 | 10/1967 | Bose et al. | 236/11 X |
| 3,955,792 | 5/1976 | Cho | 251/294 X |
| 4,294,283 | 10/1981 | Scharres | 251/305 X |
| 4,312,474 | 1/1982 | Tulowiecki | 165/25 X |

*Primary Examiner*—William E. Tapolcai

[57] ABSTRACT

A self-operating damper device constructed to be installed in open ended furnace duct boots which terminate in room registers, said device operating in parallel with multiple units as part of a forced air heating and cooling system for the purpose of controlling and regulating the flow of the heating/cooling medium to individual rooms, independently and simultaneously through opening and closing of damper plate. Self-operating damper means include damper housing with rotatable damper plate hving an integral shaft with attached end pulley, said pulley being interconnected with motor means through drive belt which encircles both the damper pulley and motor pulley with drive motor being controlled by switch means operated by rotating cam on motor output shaft, said motor responding to commands of room thermostat which influences both motor means and combustion cycle of combustion means.

10 Claims, 6 Drawing Figures

SELF-OPERATED AIR REGISTER DAMPER

SUMMARY AND DETAILED DESCRIPTION

Various automatic dampers are in existence, with the more familiar devices designed to regulate air flow and control temperatures in multizoned buildings or to regulate the heating medium as it passes through the furnace ducts but prior to said medium reaching room registers. The air flow and temperature control systems designed for use in multizoned buildings are quite sophisticated, and do not readily lend themselves to use in single family dwellings. Existing dwellings having ducts installed between floor or ceiling joists and between wall studs do not permit easy installation of those automatic dampers that require placement within the duct proper.

Due to the fact that the most common residential dwelling air register device requires manual operation of the associated damper means, it is necessary that someone be present to manually open or close the damper plate as required—with varying degrees of success in keeping said room at a comfortable temperature.

The present self-operating damper device overcomes these and other limitations of existing damper devices by providing an automatic damper control means within the furnace duct termination within subject room. The self-operating device, being installed in the open ended duct termination and housed within the confines of the existing or new air register, commonly on the market, is automatically controlled by thermostatic means peculiar to each room and subject damper means.

The advantages of the present device include simplicity of installation within the exposed open ended duct boots, economy in capital costs and installed costs, control of individual room temperatures and air flow through automatic damper control means electrically connected to furnace control means. By heating or cooling individual rooms to different temperatures based on use of said room, the present device can substantially reduce heating and air conditioning costs. The cost savings and the gain in more efficient use of heating and air conditioning equipment are incurred without major changes or modifications to existing equipment.

The subject damper means incorporate a damper plate mounted to rotate between a closed position, substantially restricting flow through the furnace duct, and an open position permitting substantially unrestrained flow therethrough. Through motor means, the damper control means are electrically connected to the room thermostat and to the furnace control means or to a like heating or cooling device. When room thermostat provides an electrical signal, furnace fuel means and drive motor are simultaneously energized. The damper plate, operatively connected to the motor means is rotated to the open position by the drive belt, connecting said damper plate to drive motor, as switch cam, attached to motor shaft, operates switch lever to prepare circuit for next cycle. Subject damper remains biased to the open position until the room thermostat is satisfied, whereupon, the thermostatic switch means de-energize the furnace control means and energize the drive motor, thereby, urging said motor to rotate the damper to its closed position by turning associated pulley and pulley belt.

It is preferred that the materials of construction for the subject damper means be rust proof and corrosion proof and be capable of withstanding a temperature range normally associated with forced air heating and cooling systems without suffering malfunctions, breakdowns, and frequent maintenance requirements. The present invention is constructed to provide a smooth flow path for the heating medium with minimal obstruction to flow.

One of the principal objectives of the present invention is to selectively provide conditioned air (heated or cooled) to individual rooms within a dwelling served by a central air-conditioning unit, such as a furnace or like device.

Another objective is to reduce the operating cost associated with furnaces, cooling units, and other like devices used in conditioning the warming or cooling medium.

Another objective is to reduce fuel consumption in furnaces, cooling units and similar devices.

Another objective is to incorporate a self-operating damper means in the duct boot within each room of a dwelling and significantly increase the efficiency and operating life of furnaces and like devices.

Another objective is to provide a self-operating damper device which remains closed, thereby, restricting air flow from furnace to the room whenever room temperature equals or exceeds the thermostat setting.

Another objective is to provide a relatively inexpensive automatic damper device for installation in new and existing open ended duct boots.

Another objective is to provide a self-operating damper device which ccan be opened or closed during heating cycle of furnace or like device.

Another objective is to provide a self-operating register damper means which resist rust and corrosion and operate within the normal temperature range for residential furnace and air conditioning equipment ahd having minimal maintenance and repair requirements.

Another objective is to provide a self-operating damper means having a safe electrical interlock with furnaces and like devices.

Another objective is to provide self-operating damper means with quiet operational characteristics.

These and other objects and advantages of the present invention will become apparent after considering the following detailed specification and accompanying drawings which cover a preferred embodiment wherein.

Figure 1:
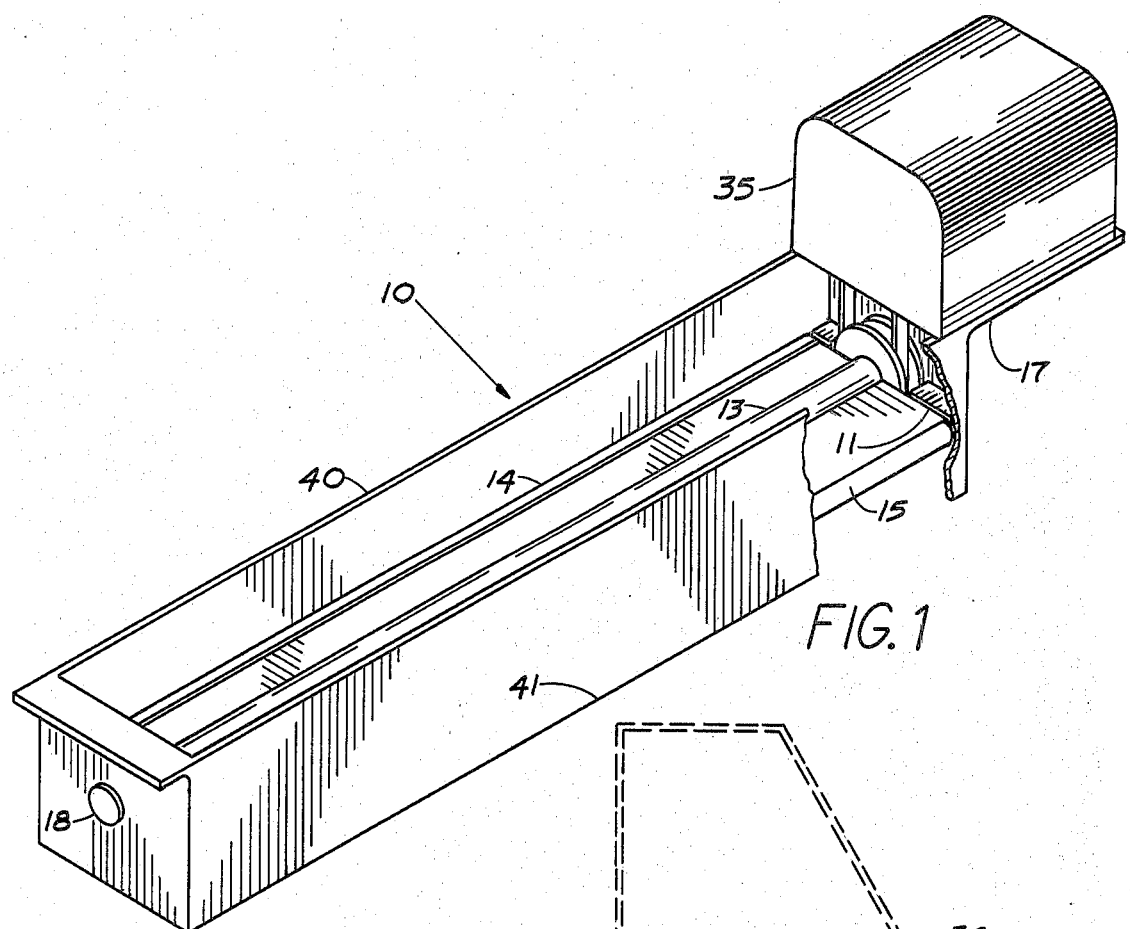
FIG. 1 is a perspective view of self-operating damper means constructed according to the present invention.

Referring to the views more specifically by reference numbers, FIG. 1 shows an automatic damper device 10 constructed according to the present invention. The subject device includes a damper housing 12 to be installed in a furnace duct boot 37 or like facility shown in dashed outline and a motor means 23 attached to the projecting shelf 17 of damper housing 12 shown in FIG.

2. Rotatable shaft 13 integral with damper plate 11 and supported by bearing pins 18 and 19 in end panels 38 and 39 of damper housing 12 extends along the length of damper housing axis, said shaft 13 bisects the space between the rear panel 40 and front panel 41 of said damper housing and has damper plate 11 integrally formed along longitudinal axis of said shaft. Damper plate 11 rotates with subject shaft between open and closed positions within the damper housing. When biased to the closed position, the damper plate with attached compressible sealing means 14 and 15 engage front and rear panels of damper housing 12 for the purpose of substantially restricting air flow through the space controlled by the damper means, thereby, restricting air movement into associated room. Damper plate 11 is shown in closed position by solid line representation in FIG. 2 and in an open position by the dashed outline.

The housing 12 of the automatic damper device 10 is required to be inherently rigid for the purpose of maintaining the original cross-section throughout its service life, subject housing is preferably constructed from rigid, heat resistant and fire retardant plastic material or from heavy guage steel or like material coated with baked-on enamel to present a pleasing appearance.

Figure 4:
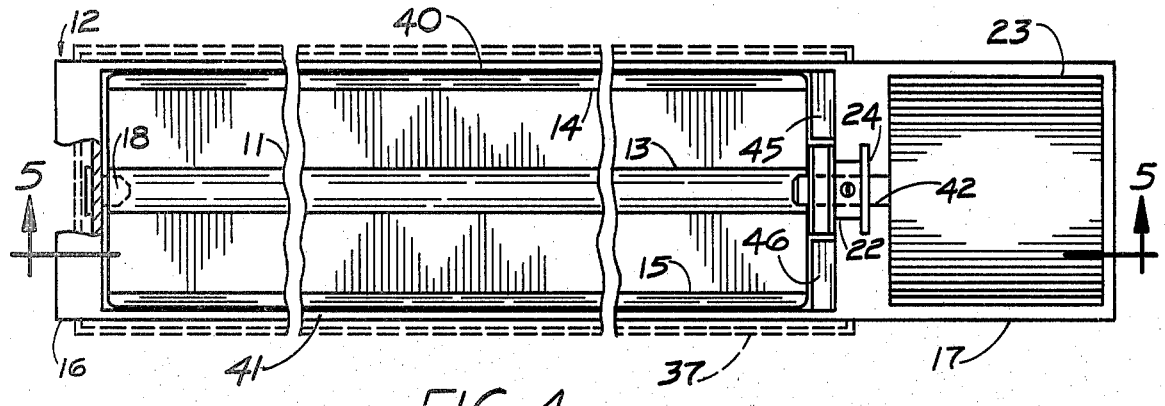
FIG. 4 is a plan view of the register damper device.
Figure 5:
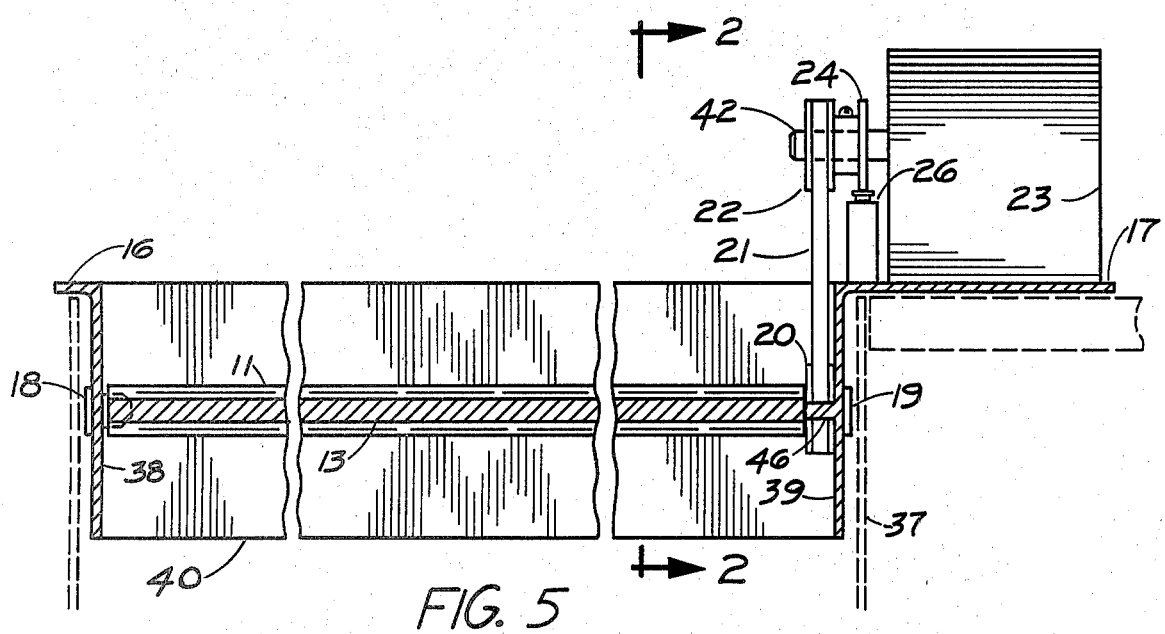
FIG. 5 is a cross-sectional view along line 5—5 of FIG. 4.

As shown in FIGS. 4 and 5, end shelf 17 extends beyound end of panel 39 for the purpose of attaching the motor means thereto. Each end panel, 38 and 39, contains a hole of proper diameter to receive bearing pins 18 and 19 which are constructed of low coefficient of friction material, such as Teflon, and said pins cooperate to engage the ends of rotatable shaft 13 with integrally formed damper plate 11 and pulley 20. Shaft 13 incorporates pulley 20 attached to extremity of said shaft and damper plate for the purpose of capturing drive belt 21 which serves to rotate the combined unit.

Attached to the interior surface of panel 39 are plate sealing means 45 and 46 which serve to seal off the space between end of damper plate 11 and interior face of said panel to prevent excessive passage of air while providing required clearance for pulley and drive belt 21.

Damper plate 11 being essentially one continuous section, is shortened along the longitudinal axis, (FIG. 4), for the prescribed purpose of providing clearance and freedom of movement for belt 21 and pulley 20 during operation of damper means. When said belt rotates shaft 13 and damper plate to the open position, the open damper cooperates with furnace means in the transfer of conditioned air through register 36 into subject room which is required to be heated or cooled. Progressive rotation of the damper plate biases said damper mechanism to the closed position. Combination damper plate 11 and shaft 13 are preferably constructed from materials which can operate maintenance free over long periods of time in an atmosphere common to furnace ducts and like devices.

When said damper plate resides in the closed position, a relatively compressible air sealing material 14 and 15 attached respectively to opposite edges of said damper plate engages front and rear panels 40 and 41 of damper housing 12 and cooperates in restricting air flow through damper means. The compressible sealing means are preferably constructed from a material such as silicon rubber like material normally not affected by the range of temperatures associated with residential heating and cooling equipment, said sealing means are specially shaped to fit around leading edges of damper plate 11 and be secured to said edges by compatible bonding agent.

Figure 2:
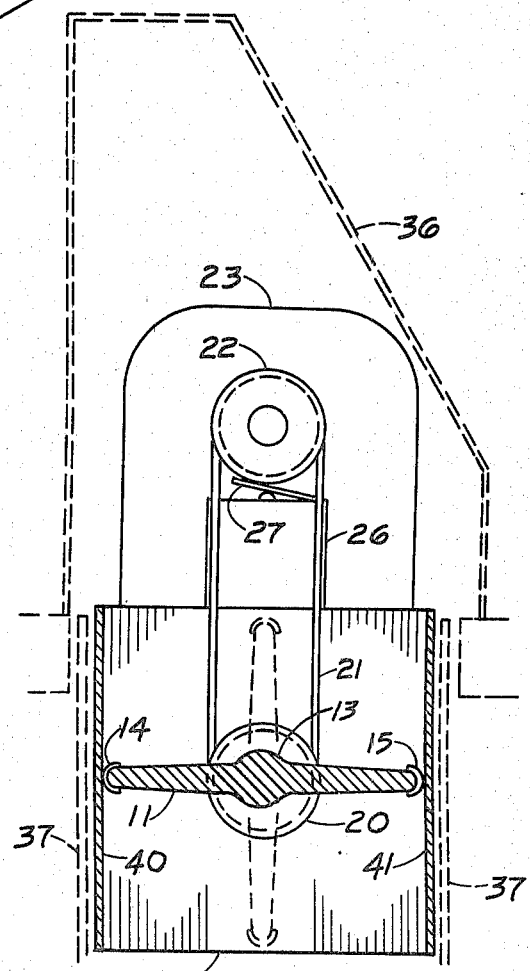
FIG. 2 is a cross-sectional view taken along line 2—2 of FIG. 5.

As shown in FIGS. 2 and 5, belt 21 provides the connection between damper means and motor means. When energized by the electrical source, the motor means operate the damper means through interconnecting belt 21, thereby, controlling movement of heated or cooled air into subject room in response to the demands of thermostat 28 of FIG. 6. More specifically, when motor 23 becomes energized, motor shaft 42 rotates pulley 22 causing belt 21 to rotate pulley 20 and shaft 13 thereby opening damper 11. As shaft 42 completes a quarter of a revolution, cam 24 engages switch lever 27 of two-way switch 26 and forces said lever to disconnect the circuit heretofore energizing motor 23. Damper plate 11 remains biased to the open position until the thermostatic means has been satisfied, at which time the thermostat switch means cause motor 23 to be energized and shaft 42 is persuaded to execute an identical procedure to close damper 11. Thermostat 28 influences participation of all other associated mechanisms required to cooperate in closing damper 11, thereby, restricting further air flow through the damper means and into subject room.

Thermostat 28 is schematically shown as a four-conductor single pole double throw switch (FIG. 6) having terminals 4, 5, and 6 comprising contacts 5-4 and 5-6. Terminal 5 provides a connection for the thermostatic switch lever and a first conductor receiving current from another conductor proceeding from gas valve 29; terminal 4 provides a connection common to a second conductor 48 and a third conductor connecting terminal 4 to light "B". Conductor 48 incorporates light means "Y" and energizes said light means jointly with relay coil 34 and fuel means solenoid 43 when said thermostatic switch lever is in a first switch position closing contacts 5-4. In the first switch position said switch lever energizes motor 23 through contacts 1 and said third conductor connecting said thermostat 28 to said two-way switch 26. Switch 26 is electrically connected in parallel with relay 34. When said switch lever is in a second switch position, thermostat 28 energizes motor 23 through a fourth conductor connecting terminal 6 and light "G" through contact 2 of switch 26.

As shown in FIG. 1, motor covering means 35, encloses the motor means and protects the control mechanism contained therein while adding to the appearance of the device.

Figure 6:
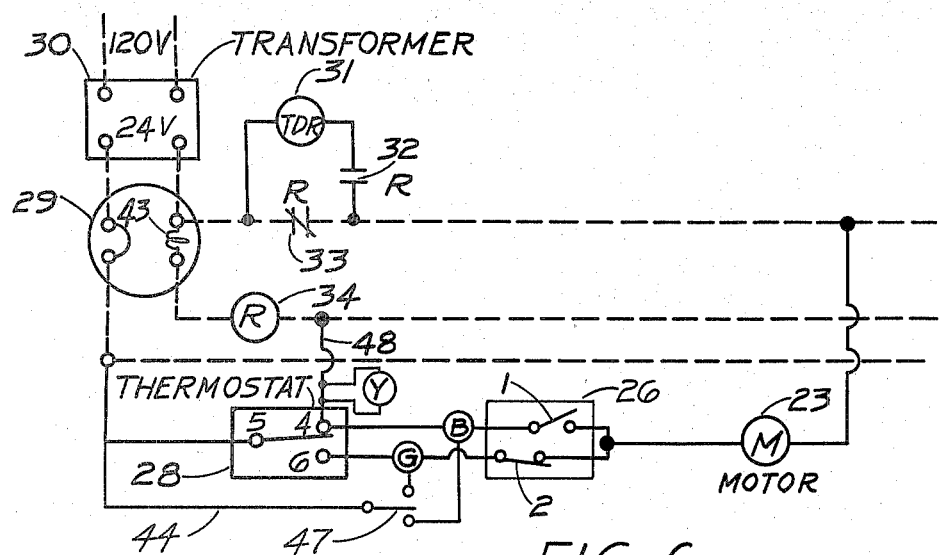
FIG. 6 is a circuit diagram of the present invention including showing the electrical interface with an associated furnace device.

The electrical circuit that energizes the preferred embodiment is shown in FIG. 6 with solid lines showing wiring of invention being controlled and dashed lines showing wiring of the associated device such as a furnace or other air conditioning means. When temperature of subject room associated with thermostat 28 falls below the present thermostat temperature setting, subject thermostat signals gas valve 29 to open and activate furnace means allowing current to flow through the secondary winding of transformer 30, internal wiring of gas valve 29 and through lead 44 connecting thermostat 28 to said gas valve.

FIG. 6 shows the electrical circuit for one of the self-operated air register dampers with thermostat 28 permitting associated room to be heated or cooled. Current flows from the secondary winding of transformer 30 through conductor 44, through thermostatic switch 5-4 and energizes fuel means solenoid 43 by passing through conductor 48. Solenoid 43 remains energized, allowing fuel to be fed to the furnace combustion means until thermostat 28 has been satisfied, whereupon, thermostatic switch 5-4 opens as corresponding switch 5-6 closes. With thermostatic switch 5-6 in a closed position, current flows through contacts 2 of switch 26 and through motor 23, said motor rotates damper plate 11 to a closed position as shaft 42 rotates cam 24 such that contacts 1 and 2 of switch 26 are respectively closed and opened, thereby, disconnecting the electrical circuit of the air register damper. Automatic damper devices in the other rooms undergo identical experiences as the furnace means continue to supply heated or cooled air until the last thermostat is satisfied.

When last thermostat is satisfied, its internal thermostatic switch 5-4 opens to de-energize magnetic coil 34 and cause normally closed contacts 33 to arrive at an open position and normally open contacts 32 to reach a closed position while activating the time delay device 31. (The letter "R" associated with said coil 34, contacts 32 and 33 is indicative of the electrical intraconnections within the composite unit.) With thermostatic switch 5-6 and contacts 2 of the circuit switch 26 closed, the pending current flow is through the circuit connecting thermostat 28, motor 23, and time delay device 31, which is synchronized with the furnace blower to permit the last damper means to remain in an open position until the residual heated air has been blown from the furnace box. After passage of the prescribed time interval, time delay device 31, being a time delay relay or like function instrument, allows current flow through said circuit, thereby, energizing motor 23 and closing damper 11 through previously described operations.

As heretofore explained, the motor means providing for rotation of damper plate 11 incorporate motor pulley 22, drive belt 21, and damper shaft pulley 20 with said motor pulley providing movement to belt 21 which correspondingly rotates pulley 20 and damper plate 11. The subject damper device, through minor alterations in motor geometry and damper placement in housing 12 will have said motor and damper shafts adjusted in the vertical direction, thereby, decreasing the relative distance between said shafts and resulting in a condition whereby utilization of drive belt 21 for transmission of motion to damper plate 11 becomes less practical and economical due to the closer proximity of pulleys 20 and 21.

Figure 3:
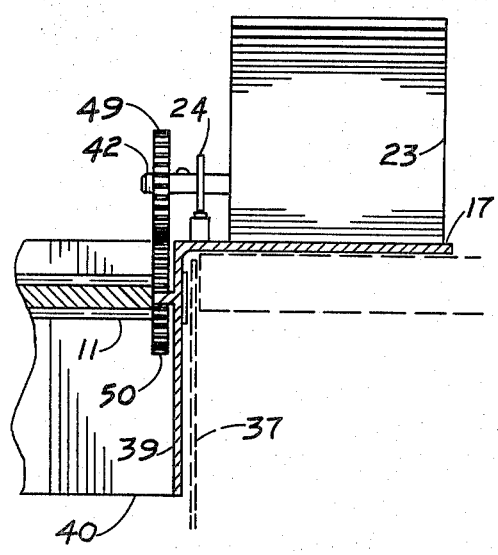
FIG. 3 is a partial view similar to FIG. 5, but showing optional gear operating means.

Stated condition allows for gears 49 and 50 to replace pulley and belt means when said motor geometry so governs, aforesaid motor being energized to rotate attached gear 49, which directly and without intermediary means rotates mating gear 50 shown in FIG. 3, thereby, opening and closing damper plate 11 in accordance with thermostat demands. The optional gear means permit the present invention to function in all the modes of operations heretofore described and specified for the pulley and belt system.

When required, said motor 23 can be manually controlled through the three position manual override switch 47 having light means, and damper plate 11 rotated to any position with the open/close status of said damper plate being given by indicator lamps "B" and "G", while lamp "Y" shows that the furnace means are in a combustion cycle and providing subject room with conditioned air. Switch 47, being a manually operated three position switch, has two positions (the extreme up and the extreme down positions) energizing motor 23 through two-way switch 26 while the middle switch position is an off position, as shown in FIG. 6, deenergizing the circuit containing conductor "44".

With the capability to close individual room dampers through separate thermostat settings, use of the subject device permits individual, personal selection of room temperatures and individual maintenance of room comfort, thereby, resulting in savings in fuel costs in winter and reduced operating costs of air-conditioning means in summer, including central air-conditioning equipment such as might be a part of the furnace installation or a separately installed system.

Thus, there has been shown and described a novel self-operated damper device which fulfills all the objects and advantages sought after. Many changes, modifications, variations and other uses and applications of the present device will, however, become apparent to those skilled in the art after considering this specification and accompanying drawings. All such changes, modifications, variations, and other uses and applications which do not depart from the spirit and scope of the invention are deemed to be covered by the invention which is limited only by the claims which follow:

I claim:

1. A self-operating damper device controlling and regulating the flow of a heating/cooling medium from a heating/cooling device into individual rooms or spaces, said heating/cooling device being part of a central air conditioning system, said damper device combinationally comprising:
  (a) an enclosure providing housing means and support means for a closure means and transmission means, said enclosure comprising a damper housing having open top and bottom sections, end panels incorporating and having first and second support means, and motor covering means, said enclosure adapted for mounting on external means adjacent to said damper housing;
  (b) said closure means providing open and closed conditions within said enclosure, said closure means being comprised of a damper blade having a damper shaft coincident with a longitudinal axis of said damper blade, compressible sealing means bonding to said damper blade, and plate sealing means attaching to one said end panel of said damper housing; said damper blade with bonded compressible sealing means comprising movable means of said closure means; said movable means being pivotally mounted in said damper housing and attaching to and rotatable by said transmission means;
  (c) said transmission means rotating said movable means pivotally mounted within said enclosure, said transmission means comprising motor means supported on said damper housing, said motor means having a rotatable motor shaft and a cam attaching to said motor shaft, a first and a second pulley having attachment to said motor shaft and said damper shaft respectively, and a continuous belt rotatably connecting said first and second pulleys;
  (d) control means operating and controlling said transmission means, said control means comprising: thermostatic means electrically interlocking relay means to a fuel control means of said heating/cooling device, and said motor means to said relay means and said fuel control means through a two way switch; said relay means having a relay coil operating first and second contacts and a time delay device connecting to and being controlled by said second contacts, a manual switch having light means interconnecting said transmission means to said fuel control means and relay means through said two-way switch.

2. The enclosure set forth in claim 1 having said first support means comprising horizontal plates attaching to a top portion of each said end panel of said damper housing, said first support means supporting said damper housing, said motor means and said motor covering means; said second support means being comprised of holes in said end panels accepting bearing means providing damper blade support.

3. The closure means set forth in claim 1 comprising said damper blade having said damper shaft coincident with said longitudinal axis, said damper shaft having a first extremity adapted to retain a pulley of said transmission means, said first extremity and a second extremity of said damper shaft being adapted for receiving bearing means supporting said damper blade jointly with said second support means; said damper blade engaging said transmission means and having longitudinal edges retaining said compressible sealing means, said damper blade being pivotally mounted in said enclosure adjacent to said plate sealing means attaching to one said end panel of said enclosure; said movable means and plate sealing means substantially restricting flow of said heating/cooling medium through said damper housing when said movable means are in a closed position.

4. The transmission means set forth in claim 1 comprising said motor means having said cam and said first pulley engaging said motor shaft, a positional relationship of said first pulley to said second pulley attaching to said damper shaft permitting said first pulley to transmit rotation from said motor means to said second pulley by means of said continuous belt rotatably connecting said first and said second pulleys; said second pulley being attached to said damper shaft thereby rotating said movable means between open and closed positions within said enclosure.

5. The control means defined in claim 1 wherein said thermostatic means having light means and a first and a second switch position electrically interlocking from said first switch position said relay means to said transmission means and said fuel control means; said interlocking rotating said movable means to an open position in said enclosure; said second switch position of said thermostatic means electrically interlocking said two-way switch to said motor means, to said first and second contacts of said relay coil, and to said time delay device; said second switch position of said thermostatic means in combination with said relay means and said transmission means rotating said movable means of said closure means to a closed position within said enclosure, or in combination with said fuel control means and time delay device permitting said transmission means to hold said movable means in an open position until a blower in said heating/cooling device has completed an operating cycle.

6. The means defined in claim 1 wherein said compressible sealing means comrpising silicon rubber or like compressible material bonded to damper blade edges with compatible bonding agent; said plate sealing means attaching to said end panel adjacent to location of said transmission means, said plate sealing means occupying a position on each side of said second pulley of said transmission means.

7. Self operating damper means rotating movable means within a damper housing controlling temperatures in individual rooms or spaces of a dwelling having a central heating/cooling device, said damper means comprising in combination:

(a) said damper housing, having first and second support means, open top and bottom sections, and enclosing said movable means rotatably connecting to transmission means;

(b) said movable means being comprised of a damper blade having a longitudinal damper shaft, compressible sealing means bonded to longitudinal edges of said damper blade, said damper shaft rotatably mounted in said damperhousing and engaging said transmission means;

(c) said transmission means, having engagement with said movable means, comprising motor means supported on said damper housing, a cam engaging rotatable shaft of said motor means and operating a two-way switch connecting to a manual switch having light means; said two-way switch attaching to said damper housing; and gear means having attachment to said motor shaft and to said damper shaft:

(d) control means providing electrical interlocks between components of said control means permitting said transmission means to rotate said movable means between open and closed positions within said damper housing; said control means comprising said thermostatic means having light means and a first and a second switch position electrically connecting to and energizing said relay means and said fuel control means simultaneously with said motor means; said motor means having electrical connections to said thermostatic means and said manual switch by means of said two-way switch operating by said cam engaging said motor shaft; said manual switch having electrical connection to said transmission means for controlling and operating said transmission means and movable means in conjunction with said two-way switch independently of said thermostatic means.

8. The means defined in claim 7 wherein said transmission means comprise said motor means having said shaft rotatably engaging said cam, a first gear and a second gear of said gear means, said first gear having rotatable engagement with said motor shaft transmitting motor rotation to said second gear; said second gear being attached to said damper shaft pivotally mounted in said damper housing, said transmission means electrically connecting to said control means and operable by either said thermostatic means or said manual switch.

9. The means defined in claim 7 wherein said relay means comprise a relay coil having first and second contacts and a time delay device being energized by means of said second contacts in combination with said thermostatic means and said fuel control means; said time delay device being a time delay relay or instrument of like function.

10. The means defined in claim 1 or 7 wherein said manual switch of said control means comprises a three position override switch having light means, said manual switch having a first and a third position connecting to and energizing said light means and said motor means of said transmission means and rotating said movable means; a second position of said manual being an off position deenergizing said light means and said motor means.

* * * * *